US011989748B2

(12) United States Patent
Jayarajan et al.

(10) Patent No.: US 11,989,748 B2
(45) Date of Patent: May 21, 2024

(54) METHODS AND SYSTEMS FOR DYNAMIC SURVEY AND WEBINAR CREATION

(71) Applicant: Zoom Video Communications, Inc., San Jose, CA (US)

(72) Inventors: Deepthi Jayarajan, Ottawa (CA); Kathleen Adams, Overland Park, KS (US)

(73) Assignee: Zoom Video Communications, Inc., San Jose, CA (US)

( * ) Notice: Subject to any disclaimer, the term of this patent is extended or adjusted under 35 U.S.C. 154(b) by 219 days.

(21) Appl. No.: 17/343,724

(22) Filed: Jun. 9, 2021

(65) Prior Publication Data

US 2022/0398611 A1    Dec. 15, 2022

(51) Int. Cl.
    G06Q 10/109     (2023.01)
    G06F 16/2457    (2019.01)
    G06F 16/953     (2019.01)
    G06Q 30/0203    (2023.01)

(52) U.S. Cl.
    CPC ... *G06Q 30/0203* (2013.01); *G06F 16/24578* (2019.01); *G06F 16/953* (2019.01); *G06Q 10/109* (2013.01)

(58) Field of Classification Search
    None
    See application file for complete search history.

(56) References Cited

U.S. PATENT DOCUMENTS

| | | | |
|---|---|---|---|
| 2006/0122861 A1* | 6/2006 | Scott | G06Q 10/00 705/7.19 |
| 2013/0212494 A1* | 8/2013 | Heiferman | G06Q 30/02 715/753 |
| 2019/0199724 A1* | 6/2019 | Kallman | H04L 63/10 |
| 2021/0036879 A1* | 2/2021 | Schrager | H04L 12/1831 |
| 2021/0109938 A1* | 4/2021 | LaPoff | G06Q 50/10 |

\* cited by examiner

*Primary Examiner* — Cory W Eskridge
(74) *Attorney, Agent, or Firm* — Kilpatrick Townsend & Stockton LLP

(57) ABSTRACT

Various embodiments of an apparatus, method(s), system(s) and computer program product(s) described herein are directed to a dynamic survey engine the receives survey content and a survey mapping associated with a host user account(s) of a scheduled online webinar. The dynamic survey engine presents at least a portion of the survey content to one or more attendee user accounts. The dynamic survey engine aggregates survey response content received from one or more attendee user accounts. The dynamic survey engine identifies a dynamic survey action based at least in part on a portion of the survey mapping that is related to at least a portion of the aggregated survey response content.

20 Claims, 8 Drawing Sheets

METHODS AND SYSTEMS FOR DYNAMIC SURVEY AND WEBINAR CREATION

FIELD OF INVENTION

Various embodiments relate generally to digital communication, and more particularly, to systems and methods for receiving and processing survey content.

BACKGROUND

Digital communication tools and platforms have been essential in providing the ability for people and organizations to communicate and collaborate remotely, e.g., over the internet. Applications for casual friendly conversation ("chat"), work meetings or gatherings, asynchronous work or personal conversation, and more have exploded in popularity. Many allow for participants to enter a conversation using any of a wide variety of devices and allow for switching between different devices in the middle of a conversation. It has also become common for such applications to allow for documents and media (such as images, video, or audio) to be uploaded to a server, where they can then be transmitted to other chat participants.

Digital communication tools and platforms provide applications for hosting video conference calls dedicated to a particular meeting room. Such video conference calls may be accessed by remote attendees via their communication platform user accounts. Multiple attendees may physically be present in the particular meeting room and view a video stream presented in the particular meeting room. The same video stream may be concurrently sent to the respective computing devices of the user accounts that remotely access the video conference call.

Recent digital communication tools and platforms are driven by cloud-based peer-to-peer software which allow users to access teleconferences and online chat services from their mobile computer devices. Individuals with user accounts on the cloud-based software communication platform are able download a client application onto their mobile computer devices and can log onto the cloud-based platform via the client application using their user account credentials.

In many cases, the user may be provided with a digital event notification that includes a link for accessing a scheduled digital event, such as a virtual meeting. The digital event may be created by a host user account. Additional user accounts that have received the digital event notification are defined as guests who have been given permission by the host user account to attend (i.e. log onto and access) the digital event.

Host and guest user accounts are provided a variety of tools and functionalities while they are logged onto a virtual meeting. The host user account may have access to record the virtual meeting and provide guest user accounts with permission to record the virtual meeting. The host and guest user accounts may be able to concurrently send chat messages during the virtual meeting. Some chat messages may be sent to all the user accounts logged onto the virtual meeting. A user account may select specific user accounts logged onto the virtual meeting who are the intended recipients of certain chat messages.

As the field of digital communication tools and platforms matures, new tools and functionalities continue to be developed. New use cases and end user scenarios emerge as a result of accelerated user adoption and different types of digital events reveal gaps in the tools and functionalities currently available.

SUMMARY

Conventional systems are deficient with respect to integrating the dynamic selection of various types of survey queries to user accounts attending various events included within an online webinar. Moreover, conventional systems lack the flexibility to dynamically determine various types of actions that should be taken in response to survey response content received by those user accounts that are actually currently participating in an online webinar event.

Various embodiments of an apparatus, method(s), system(s) and computer program product(s) described herein are directed to a dynamic survey engine the receives survey content and a survey mapping associated with a host user account(s) of a scheduled online webinar. The dynamic survey engine presents at least a portion of the survey content to one or more attendee user accounts. The dynamic survey engine aggregates survey response content received from one or more attendee user accounts. The dynamic survey engine identifies a dynamic survey action based at least in part on a portion of the survey mapping that is related to at least a portion of the aggregated survey response content.

According to various embodiments, the dynamic survey engine may be associated with an online communications platform for hosting webinars. For example, an online webinar may include a plurality of distinct webinar events that may be made available to attendee user accounts and/or presented to attendee user accounts according to a schedule. For example, after an initial online webinar event, a $1^{st}$ subsequent webinar event may be made available or presented to the attendee user accounts prior to a $2^{nd}$ subsequent webinar event.

According to various embodiments, the dynamic survey engine may send various survey queries to one or more of the attendee user accounts prior to the initial online webinar event. The dynamic survey engine may further present various survey queries to the attendee user accounts during presentation of the initial online webinar event. The dynamic survey engine identifies response keywords present in the survey responses of the attendee user accounts and generates a ranked list of the response keywords. The dynamic survey engine accesses the survey mapping to identify a next action based on a ranked response keyword(s). For example, a next action may be to present another survey query or may lead to an identification of a subsequent webinar event that is relevant to the attendee user accounts.

The dynamic survey engine thereby provides advantages and improvements over conventional systems by aggregating survey responses received prior to, during and/or after presentation of an initial webinar event(s) in order to identify the most common occurring topics, phrases, keywords and themes in the survey responses. The dynamic survey engine uses the survey mapping and the most common occurring type of content in the survey responses to either identify subsequent survey queries to be pushed to one or more of the attendee user accounts or to identify a subsequent webinar event that is most relevant to the actual interests of the attendee user accounts as represented by their survey response content. For example, the dynamic survey engine may identify which subsequent webinar event should be made available to the attendee user accounts or when the subsequent webinar event should be scheduled or rescheduled.

The dynamic survey engine thereby dynamically aggregates survey responses prior to, during and/or after an initial portion of an online webinar event in order to select, schedule and/or reschedule subsequent webinar events in real-time. For example, a particular subsequent webinar event may be scheduled to begin directly after the initial portion of the online webinar event. However, based on the survey responses from the attendee user accounts, the dynamic survey engine may determine a different subsequent webinar event should be scheduled to occur directly after the initial portion of the online webinar event. By dynamically changing available and/or scheduled subsequent webinar events, the dynamic survey engine ensures a greater level of engagement from the attendee user accounts and increases the likelihood that the attendee user accounts will continue to attempt to access later scheduled webinar events.

In some embodiments, the dynamic survey engine receives survey content and a survey mapping from a host user account(s) associated with the online webinar (i.e. the initial online webinar events and all possible subsequent webinar events). For example, the survey content may include various survey queries to be presented to an attendee user account(s)

In some embodiments, the survey mapping may represent an association between a response keyword(s) and an action(s). For example, an action may be a subsequent survey query or an identification of a particular webinar event.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
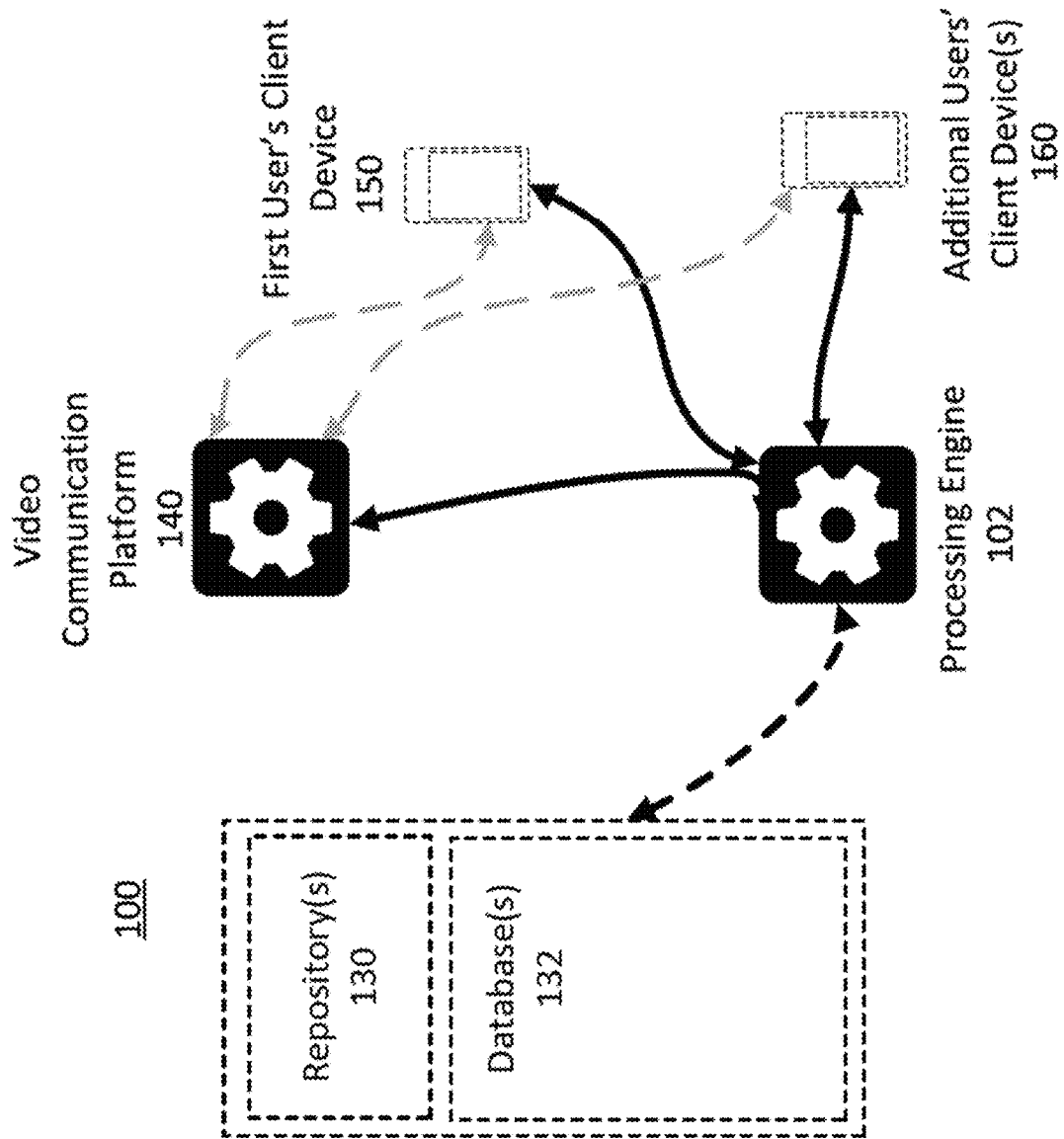
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a sending client device 150, one or more receiving client device(s) 160 and a meeting room controller device 152 are connected to a processing engine 102 and, optionally, a communication platform 140. The processing engine 102 is connected to the communication platform 140, and optionally connected to one or more repositories and/or databases for survey data 132, such as survey queries, survey mappings, keywords, survey responses, user account data, webinar event data, training data, machine learning data, action data, survey content aggregation data and scheduling data. One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment, the processing engine 102 may perform the method 400 (FIG. 4) or other method herein and, as a result, may identify one or more dynamic survey actions. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication.

Figure 1B:
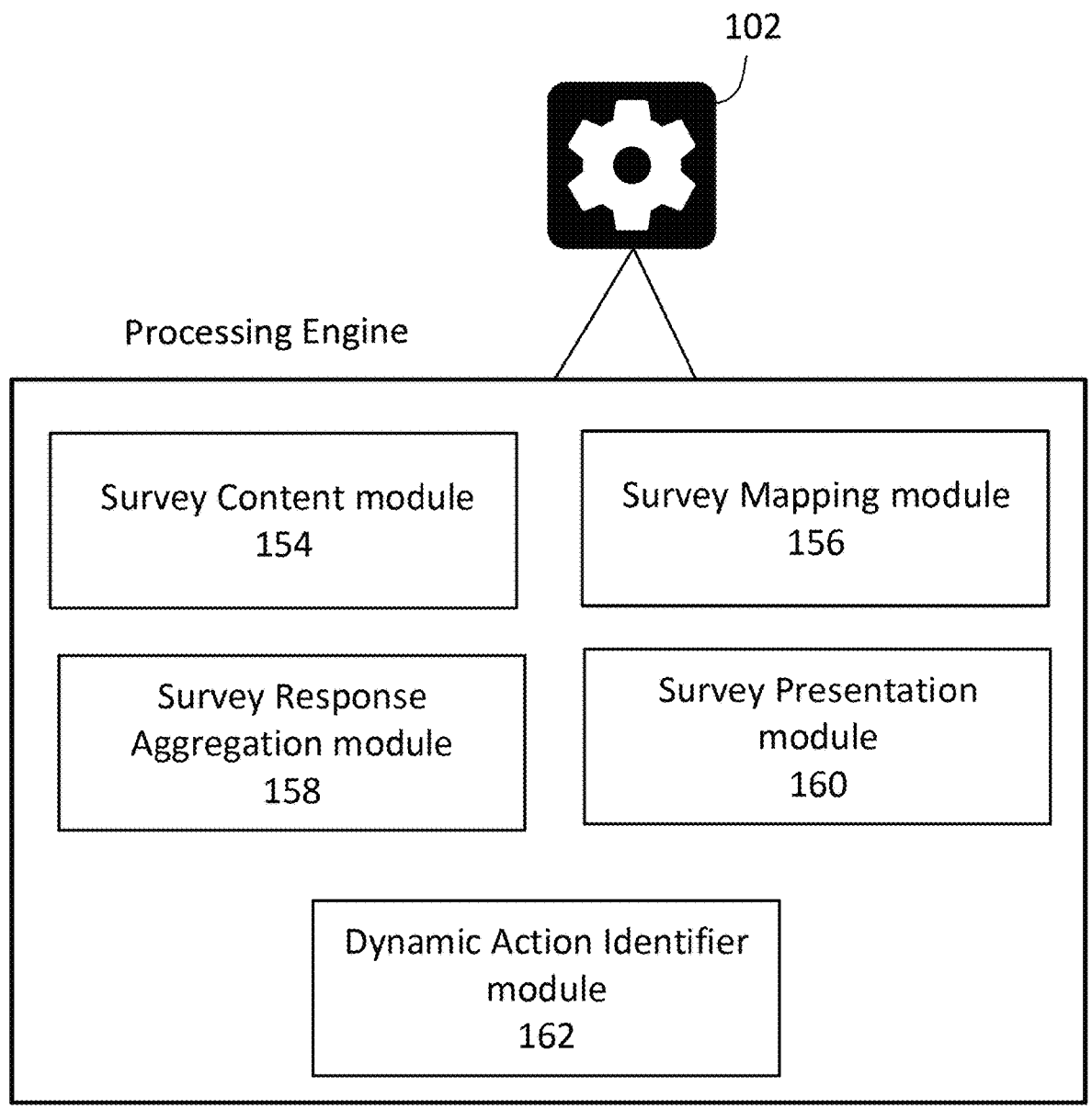
FIG. 1B is a diagram illustrating an exemplary environment in which some embodiments may operate.

FIG. 1B is a diagram illustrating exemplary software modules 154, 156, 158, 160, 162 that may execute at least some of the functionality described herein. According to some embodiments, one or more of exemplary software modules 154, 156, 158, 160, 162 may be part of the processing engine 102. In some embodiments, one or more of the exemplary software modules 154, 156, 158, 160, 162 may be distributed throughout the communication platform 140.

Survey content module 154 functions to receive, store, manage and/or process survey content as described herein.

Survey mapping module 156 functions to functions to receive, store, manage and/or process a survey mapping as described herein.

Survey response aggregation module 158 functions to receive, store, manage, aggregate and/or rank responses to survey queries (or one or more keywords present in at least a portion of the received survey query responses) as described herein.

Survey presentation module 160 functions to select, send, manage and/or process various portions of the survey content (such as one or more survey queries) with respect to the survey mapping as described herein Dynamic action identifier module 162 functions to select, send, manage, process and/or implement one or more actions with respect to one or more relationships between the aggregated survey response content and the survey mapping as described herein.

The above modules 154, 156, 158, 160, 162 and their functions, operation, data and/or processing will be described in further detail in relation to FIGS. 2-6.

Figure 2:
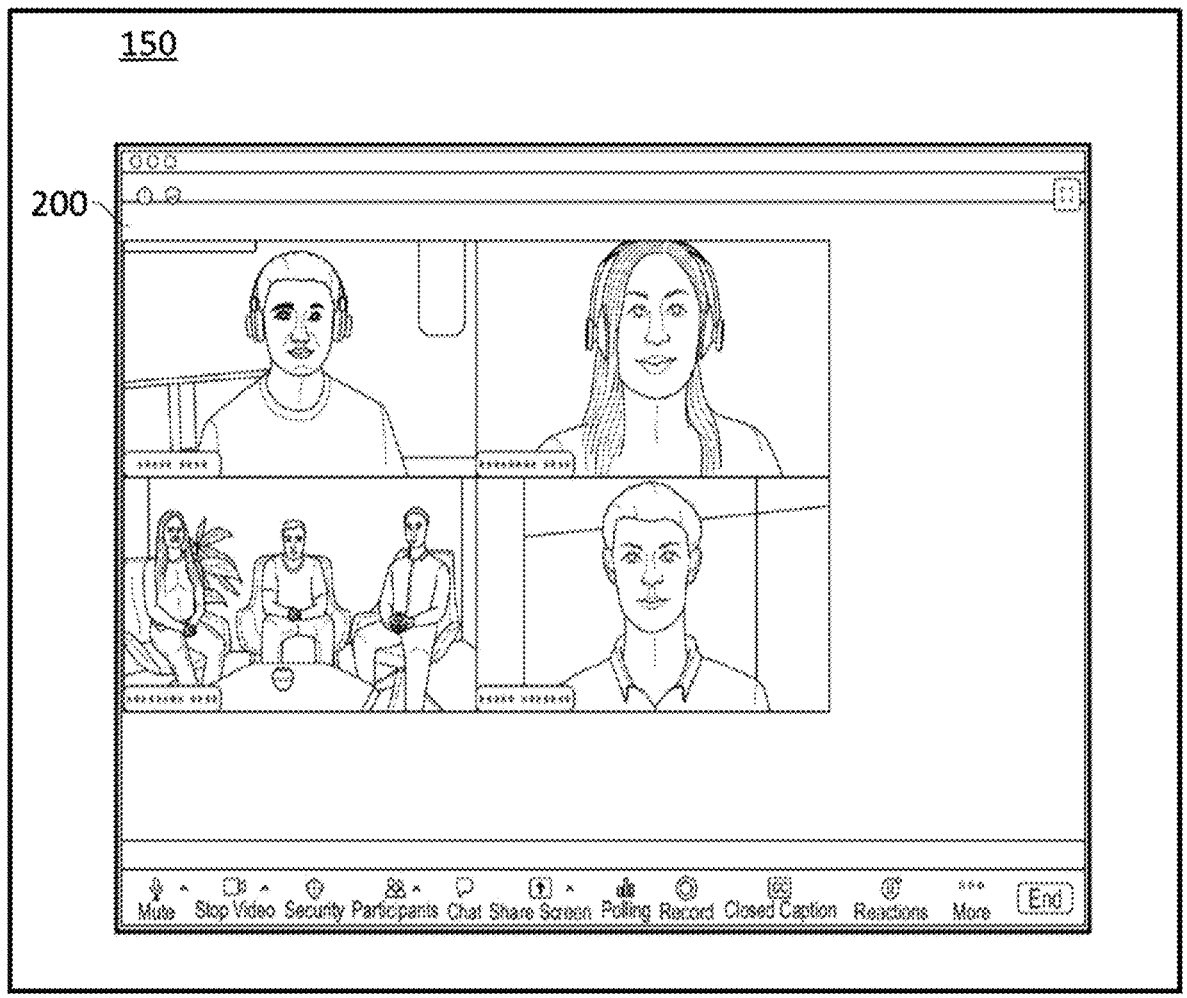
FIG. 2 is a diagram illustrating an exemplary environment in which some embodiments may operate.

As shown in FIG. 2, user account communications interface 200 for accessing and communicating with the platform 140 may be executed and displayed at a computer device 150. The interface 206 provides access to video data, audio data and chat data related to a virtual meeting joined by a user account associated with the computer device 150. The interface 206 further provides various types of tools, functionalities, and settings that can be selected by a user Count during a virtual meeting. Various types of virtual meeting control tools, functionalities, and settings are, for example, mute/unmute audio, turn on/off video, start meeting, join meeting, view and call contacts, send/read chat message and/or provide edits/inputs to a whiteboard functionality. In some embodiments, the interface 206 provides an attendee user account access to view and/or participate in one or more webinar events that are included as respective parts and/or segments of an online webinar.

Figure 3:
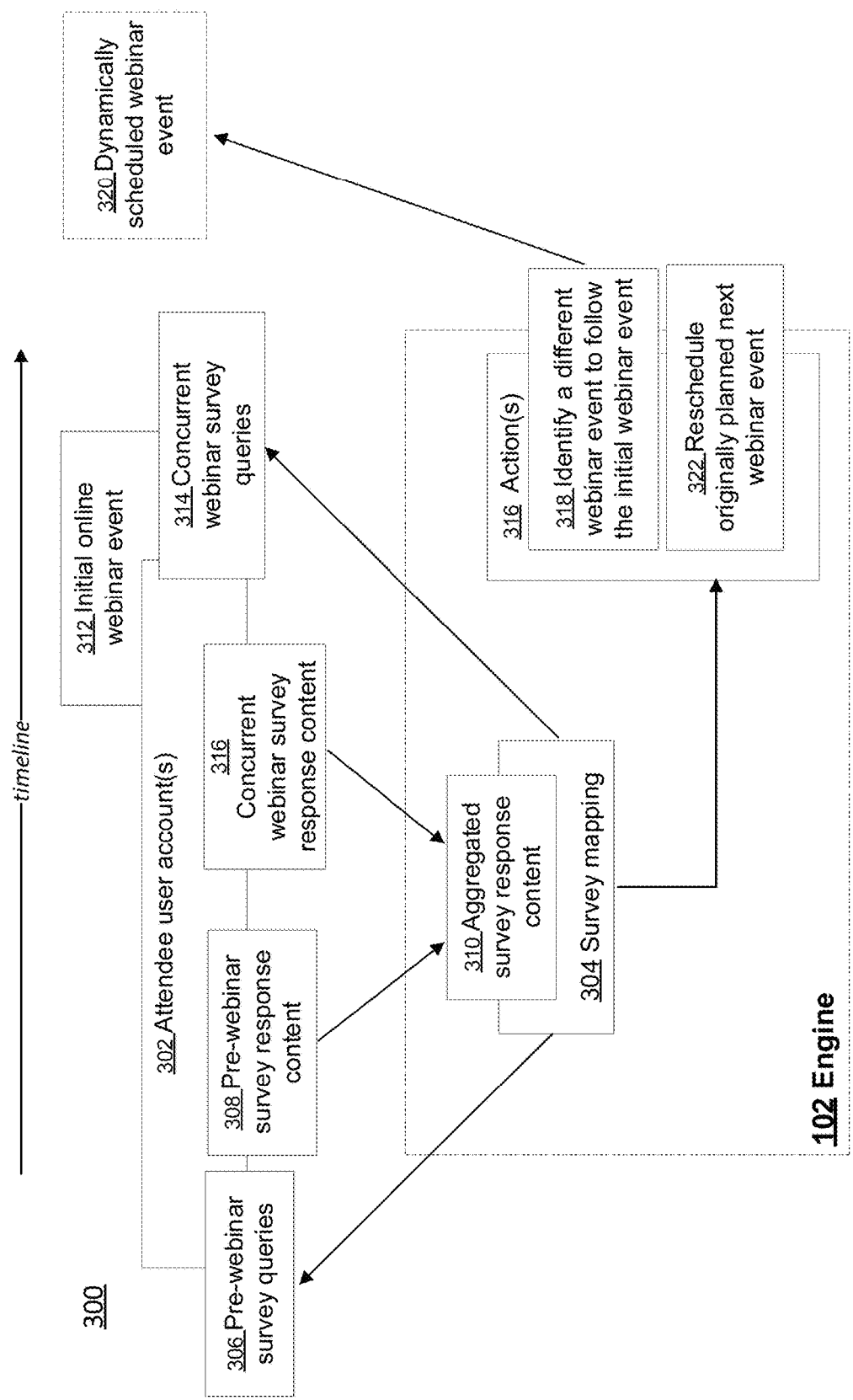
FIG. 3 is a diagram illustrating an exemplary environment in which some embodiments may operate.

As shown in FIG. 3, one or more attendee user accounts 302 may have credentials (i.e. permissions, invitations) for participation in an online webinar associated with a host user account (s). In some embodiments, an online webinar may include a plurality of separate online webinar events that are scheduled to be presented to the attendee user accounts 302 over the course of a timeline (such during a specified range of time). For example, the online webinar may have an initial online webinar event 312, such as a keynote/introductory webinar event, that will be followed by subsequent webinar events according to a prescheduled event sequence. In some embodiments, the online webinar may be accessible from the communications platform 140.

The host user account may provide survey content and a survey mapping 304 in relation to the online webinar. For example, a host user account (s) may upload the survey content and the survey mapping 304 to the communications platform 140 via the dynamic survey engine 102.

In some embodiments, the survey content may include a plurality of distinct survey queries. In some embodiments, the survey mapping 304 may represent various relationships between keywords and various survey queries. In addition, the survey mapping 304 may further represent various relationships between keywords and one or more subsequent webinar events that are currently scheduled to be presented to the attendee user accounts 302 and/or may dynamically be selected to be presented to the attendee user accounts 302. The survey mapping 304 may further represent various relationships between keywords and one or more subsequent webinar events that are currently unscheduled to be presented to the attendee user accounts 302.

According to various embodiments, the host user account may select one or more pre-webinar survey queries 306 to be presented to some or all of the attendee user accounts 302 prior to a start time of the initial online webinar event 312. The processing engine 102 (i.e. dynamic survey engine) sends the selected pre-webinar survey queries 306 to the attendee user accounts 302. For example, the pre-webinar survey queries 306 may be accessible to one or more of the attendee user accounts 302 via a link in an email generated by and sent from the dynamic survey engine 102. The pre-webinar survey queries 306 may further be accessible to the attendee user accounts 302 via a link embedded in a chat message received in a respective interface 200 or a link included in a text message sent to a mobile device associated with an attendee user account.

According to various embodiments, the dynamic survey engine 102 receives survey response content 308 sent from one or more of the attendee user accounts 302 in response to the pre-webinar survey queries 306. The dynamic survey engine 102 processes and analyzes the received survey response content 308 to generate one or more portions of aggregated survey response content 310. The dynamic survey engine 102 identifies various similarities between a portion(s) of the aggregated survey response content 310 and predefined keywords of the survey mapping 304. In various embodiments, the dynamic survey engine 102 may calculate a relevancy score for the predefined keywords of the survey mapping 304 that are identified as being similar to one or more portions of the aggregated survey response content 310. The dynamic survey engine 102 may further generate a ranked list of the scored keywords.

The survey mapping 304 further includes various relationships between the predefined keywords and survey queries and one or more subsequent webinar events. Example, the dynamic survey engine 102 may identify survey queries 314 based on the aggregated survey response content 310 that results from the pre-webinar survey response content 308. The dynamic survey engine 102 presents the identified survey queries 314 to the attendee user accounts 302 concurrently with a presentation of the initial online webinar event 312 to the attendee user accounts 302.

As the attendee user accounts 302 participate in the initial online webinar event 312, the attendee user accounts 302 may send survey response content 316 in response to the survey queries 314 concurrently presented along with the initial online webinar event 312. The dynamic survey engine 102 receives the webinar survey response content 316 during (or after) the presentation of the initial online webinar event 312, and integrates the survey response content 316 into the aggregated survey response content 310.

The dynamic survey engine 102 may further update and modify the aggregated survey response content 310 according to the survey response content 316. For example, the dynamic survey engine 102 may update a ranked list of keywords based on respective instances of survey mapping keywords present in the survey response content 316. The dynamic survey engine 102 may identify one or more actions based on one or more portions of the aggregated survey response content 310. For example, a high-ranked survey mapping keyword in the ranked list of keywords may be associated with a subsequent webinar event 320 which is scheduled to be made available to the attendee user accounts 302 at a later time or may not be scheduled at all.

The dynamic survey engine 102 determines various actions 316 due to the relationship between the high-ranked survey mapping keyword and the webinar event 320. For example, the dynamic survey engine 102 may execute an identification action 318 to identify a different webinar event that should follow the initial online webinar event 312. The dynamic survey engine 102 may further execute a rescheduling action 322 based on the identification action 318. The rescheduling action 322 identifies a webinar event currently scheduled to take place directly after the initial online webinar event 312 and flags that currently scheduled subsequent webinar event for rescheduling. The dynamic survey engine 102 may further select the identified webinar event 320 to be scheduled in place of the originally scheduled subsequent webinar event.

Figure 4:
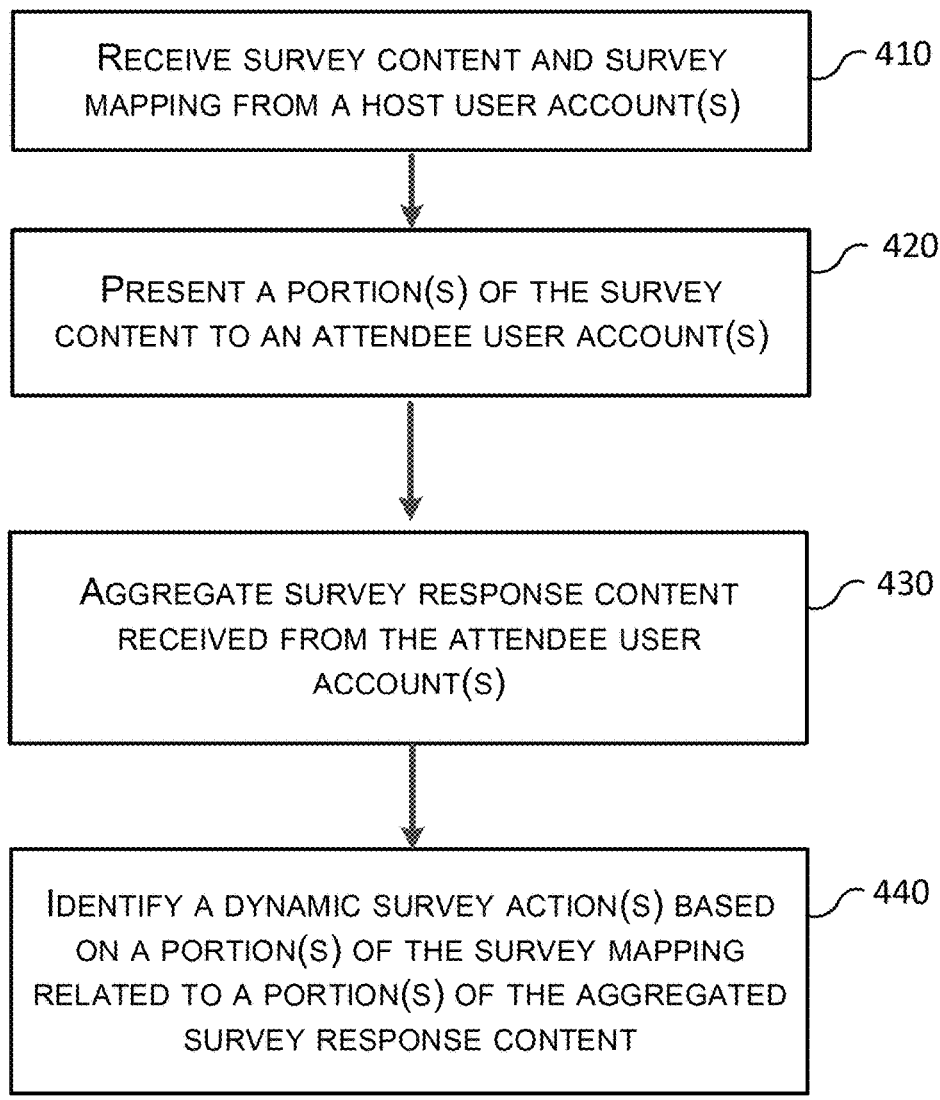
FIG. 4 is a diagram illustrating an exemplary method that may be performed in some embodiments.

As shown in flowchart 400 of FIG. 4, the dynamic survey engine 102 receives survey content and a survey mapping associated with host user account of a scheduled online webinar. (Act 410) in various embodiments, a host user account(s) upload one or more survey queries, one or more survey response keywords (i.e. survey mapping keywords) and a survey mapping that defines associations between the uploaded keywords and one or more actions. For example, the survey mapping may represent a mapping tween a keyword and respective mapping nodes. It is understood that a mapping node may be, but is not limited to, survey query and/or online webinar event.

The dynamic survey engine 102 presents at least a portion of the survey content to one or more attendee user accounts. (Act 420) In various embodiments, dynamic survey engine 102 presents pre-webinar survey content to a respective attendee user account prior to the respective attendee user account joining a live session of the $1^{st}$ scheduled online webinar, such as an initial online webinar event or a keynote/introductory online webinar event.

In various embodiments, the dynamic survey engine 102 may send a survey query to one or more attendee user accounts such that the sent survey query is compatible with, or formatted for, presentation over a specific predefined portion of an instance of the interface 200 associated with a user account. For example, one or more survey queries may be presented as an overlay over a lower third portion of the interface 200. For example, a survey query may be rendered at a lower $3^{rd}$ portion such that it is temporarily displayed for a predefined amount of time and then the rendered instance of the survey query gradually fades away from being displayed.

The dynamic survey engine 102 aggregates survey response content received from one or more attendee user accounts. (Act 430) In various embodiments, the dynamic survey engine 102 identifies a plurality of sponsor keyword instances in survey response content received prior to an initial online webinar event. For example, the initial online webinar event may have a predefined schedule of a series of subsequent webinar events.

The dynamic survey engine 102 generates a ranked response keyword list based on similarities between various portions of the aggregated survey response content and the survey mapping. For example, the ranked response keyword list may be based on similarities between survey mapping keywords and instances of similar words present in the survey response content received from the attendee user accounts. The dynamic survey engine 102 may select a particular subsequent webinar event based on the ranked response keyword list. For example, the dynamic survey engine 102 may apply a ranking threshold against the ranked sponsor keyword list in order to identify one or more ranked keywords that each have respective rankings that satisfy the ranking threshold. The dynamic survey engine 102 may further filter the identified ranked keywords that satisfy the ranking to identify any respective ranked keyword that maps to a mapping node that represents a subsequent webinar event.

The dynamic survey engine 102 identifies a dynamic survey action based at least in part on a portion of the survey mapping that is related to at least a portion of the aggregated survey response content. (Act 440) In various embodiments, upon identifying a subsequent webinar event associated with a ranked keyword, the dynamic survey engine 102 may update a scheduled start time of the identified subsequent webinar event. For example, the dynamic survey engine 102 may change a placement of the identified subsequent webinar event in a predefined schedule of a series subsequent webinar events.

Figure 5:
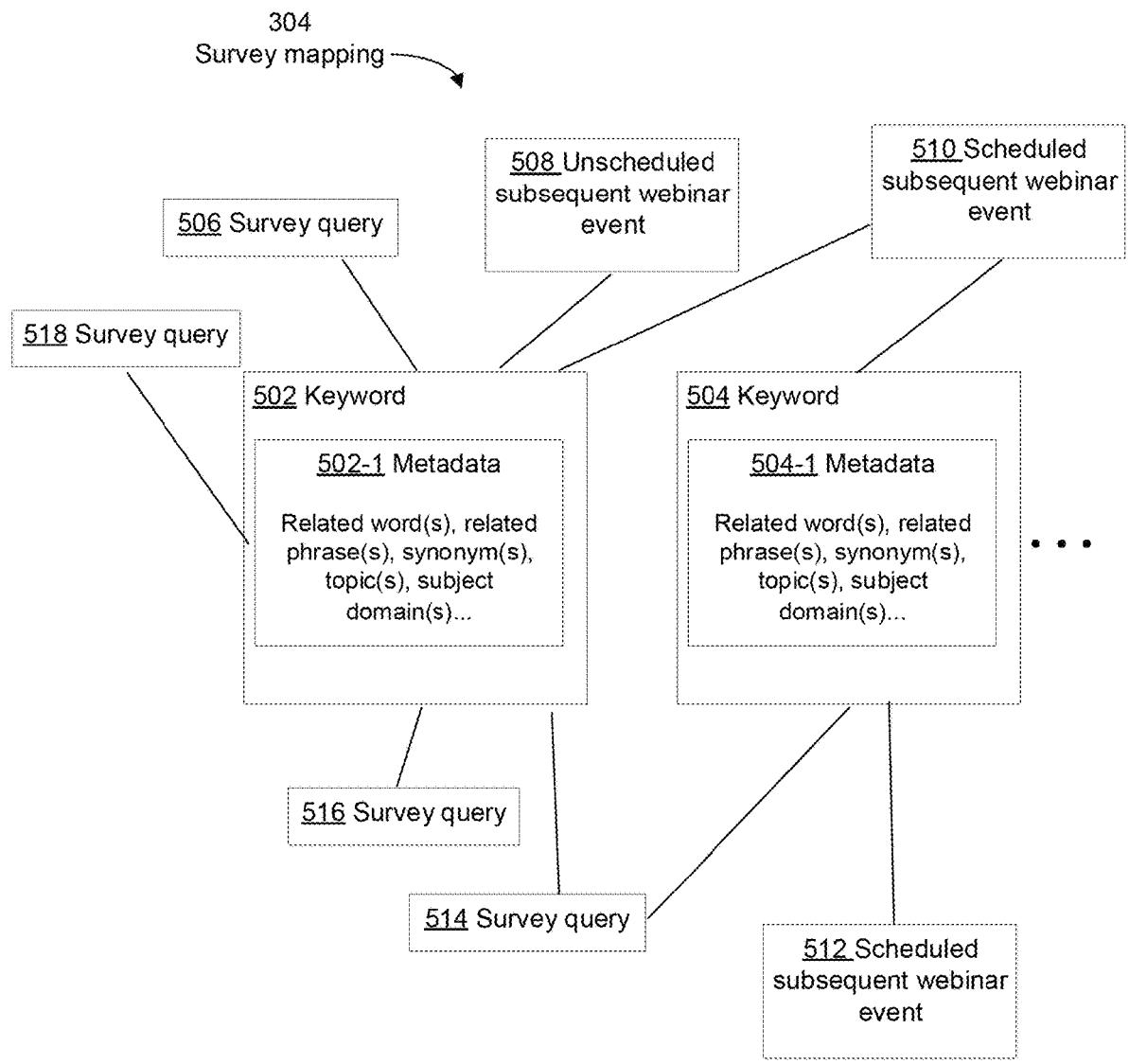
FIG. 5 is a diagram illustrating an exemplary environment in which some embodiments may operate.

As shown in FIG. 5, a portion(s) of the survey mapping 304 may include relationships between various keywords 502, 504 and survey mapping nodes, such as survey queries 506, 514, 516, 518 and/or webinar events 508, 510, 512. In some embodiments, the dynamic survey engine 102 receives survey response content that corresponds to various survey queries that have been sent to one or more attendee user accounts 302. The dynamic survey engine 102 continually and/or dynamically aggregates the received survey response content in order to identify and rank (i.e. to surface) the most relevant keywords in the survey mapping 304 that are related to words and/or phrases in the received survey response content.

In one or more embodiments, the dynamic survey engine 102 identifies one or more keywords defined in the survey mapping 304 that are present as keyword instances in the survey response content and/or aggregated survey sponsored content 310.

In various embodiments, the survey mapping 304 may further include metadata 502-1, 504-1 associated with each survey mapping keyword 502, 504. Metadata 502-1, 504-1 include a dictionary of various similar words (i.e. synonyms) for a corresponding survey mapping keyword 502, 504. For example, the metadata 502-1, 504-1 may describe a topic(s) and/or a subject domain(s) that corresponds with a respective survey mapping keyword 502, 504. As such, the dynamic survey engine 102 may detect similarities between instances of words and/or phrases present in a certain survey responses and the metadata 502-1 of a particular survey mapping keyword 502. Upon detecting such a similarity, the dynamic survey engine 102 may associate the certain survey response with a survey mapping keyword 502 that corresponds to the similar metadata 502-1. For example, ten survey responses may include an instance of a particular survey mapping keyword 502 and/or one or more words/phrases that are similar to metadata 502-1 of that particular survey mapping keyword 502. That particular survey mapping keyword 502 may have a predefined relationship with a subsequent survey query 518 such that if the dynamic survey engine 102 surfaces the particular survey mapping keyword 502 as a highly ranked keyword in the aggregated survey response content 310, the dynamic survey engine 102 may execute various logic and/or operations to select the subsequent survey query 518 to be sent back to the attendee user accounts 302 due to the predefined relationship of the highly ranked keyword 502 and the subsequent survey query 518.

Similarly, the dynamic survey engine 102 may determine that a highly ranked keyword 502 in the aggregated survey response content 310 has a predefined relationship with a subsequent webinar event 510 that is scheduled for presentation on the final day of the online webinar. Due to the highly ranked keyword's 502 prevalence the aggregated survey response content 310, the dynamic survey engine 102 may execute various logic and/or operations to reschedule the subsequent webinar event 510 such that it is presented to the attendee user accounts 302 at an earlier time.

Figure 6:
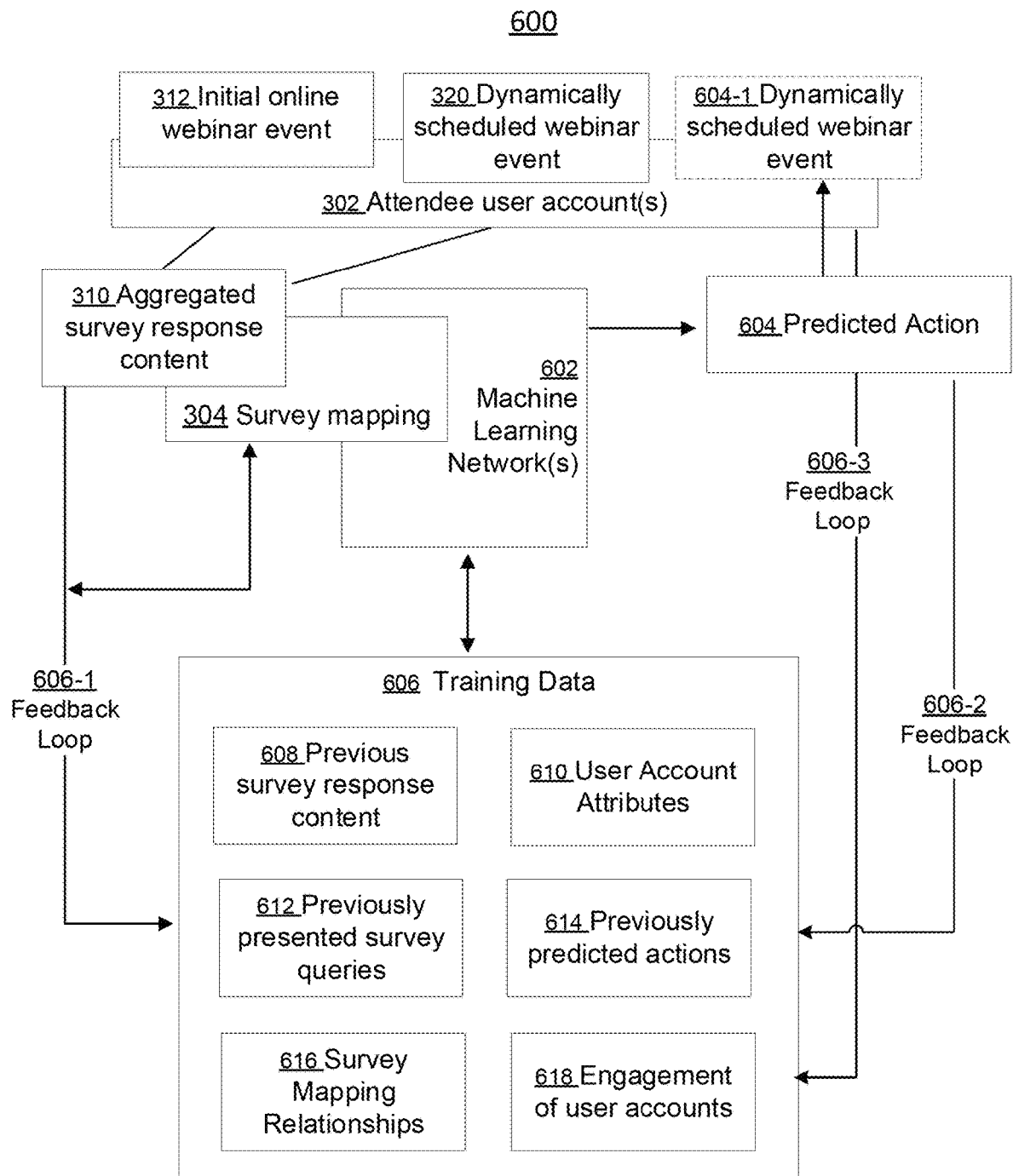
FIG. 6 is a diagram illustrating an exemplary environment in which some embodiments may operate.

As shown in FIG. 6, the survey mapping 304 may be part of a machine learning network(s) 602 that outputs a predicted action(s) 604. It is understood that in learning network(s) 602 may be considered a part (or component) of the dynamic survey engine 102. In various embodiments, the dynamic survey engine 102 performs a training phase in which it captures and organizes training data 606 and utilizes the training data 606 to train one or more portions of the machine learning network(s) 602. For example, the training data may include any of the following: previous survey response content 608, user account attributes 610, previously presented survey queries 612, previously predicted actions 614, survey mapping relationships 616 and/or previously measured levels of engagement of user accounts 618.

In various embodiments, the previous survey response content 608 may include survey response content received from one or more of the attendee user accounts 302 in response to survey queries related to the current online webinar and/or previous different online webinar. For example, the previous survey response content 608 may include survey response content received from a particular attendee user account to one or more survey queries related to an entirely different online webinar that the particular attendee user account previously attended, such as a previous online webinar that was presented a year ago. Moreover, the survey queries related to the entirely different previous online webinar may have been associated with a different survey mapping than the current survey mapping 304. In addition, the previous survey response content 608 may further survey response content received from one or more user accounts that are not included in the attendee user accounts 302.

In various embodiments, the user account attributes 610 may represent any type of user attribute associated with a user account that provided any portion of the previous survey response content 608. For example, various types of user account attributes 610 may include any of the following: geographic location, employer, profession, gender, professional experience level, content preferences, amount of webinar events attended, amount of webinar event hosted.

In various embodiments, the previously presented survey queries 612 may include one or more survey queries presented to any user account associated with a portion of the previous survey response content 608 and one or more user account attributes 610. For example, a particular survey query in the previously presented survey queries 612 may not currently be present in the survey mapping 304 but may have been previously present in a previous version of the survey mapping 304. That particular survey query may have been sent to a user account not currently listed in the attendee user accounts 302. The particular survey query may further be associated with a survey response from that user account, which is stored in the previous survey response content 608.

In various embodiments, the previously predicted actions 614 may represent one or more actions determined by the dynamic survey engine 102 with respect to the previous survey response content 608, the current survey mapping 304 and/or previous versions of the current survey mapping 304. The previously predicted actions 614 may further represent previously predicted actions 614 determined via different survey mappings, where such different survey mappings are associated with a previously presented survey query(s) 612 and/or any portion of the previous survey response content 608.

In various embodiments, the survey mapping relationships 616 in the training data 606 may represent one or more relationships in the current survey mapping 304, previous versions of the relationships in the current survey mapping 304. Moreover, the survey mapping relationships 616 may further include one or more relationships from different types of survey mappings, where such different types of survey mappings were utilized with respect to a portion of the previous survey response content 608, a portion of the previously presented survey queries 612 and/or one or more of the previously predicted actions 614.

In various embodiments, the training data 606 may further include measured levels of engagement of user accounts 618. For example, the training data 606 may store user account behaviors observed during various portions of previously presented webinar events. For example, such user account behaviors may be one or more of the following: whether/how a respective user account(s) responded to a dynamically determined action, amount of time the respective user account(s) participated in a dynamically rescheduled webinar event, whether the respective user account(s) participated in other webinar events that occurred after the dynamically rescheduled webinar event, in amount of user actions selected by the respective user account(s) during the dynamically rescheduled webinar event, such as, frequency of sending and/or responding to chat messages.

Separate from the training phase, the dynamic survey engine 102 may receive survey responses from one or more attendee user accounts 302. For example, such survey responses may be received prior to an initial online webinar event 312, during presentation of the initial online webinar event 312. Such survey response may additionally be received prior to subsequent scheduled webinar event 320 in during presentation of the subsequent scheduled webinar event 320. The dynamic survey engine 102 may aggregate, rank and/or filter the received survey responses as described herein. Further, such aggregation, ranking and/or filtering may be performed by the dynamic survey engine 102 in batches or continually.

The dynamic survey engine 102 may format various portions of the aggregated survey response content 310 and/or various portions of the survey mapping 304 as input to be fed into the machine learning network(s) 602. For example, the dynamic survey engine may generate one or more vector representations based on various portions of the aggregated survey response content 310 and/or various portions of the survey mapping 304. In response to the input, the machine learning network(s) 602 may output one or more predicted actions 604. For example, a predicted action 604 may be an identification of an unscheduled webinar event 604-1 to be scheduled by the dynamic survey engine 102 to be presented after a preceding scheduled webinar event 320.

In various embodiments, machine learning network(s) 602 may output the predicted action 604 of identifying the unscheduled webinar event 604-1 based on an inference that scheduling the webinar event 604-1 will result in a greater likelihood of a threshold amount of user account engagement over a period of time following an end time of the webinar event 604-1. For example, the inference generated by the machine learning network(s) 602 may further be based on attributes of the attendee user accounts 302, the survey mapping 304, various portions of the aggregated survey response content 310 and one or more attributes of the webinar events 312, 320 currently scheduled for presentation.

In some embodiments, one or more feedback loops 606-1, 606-2, 606-3 may be implemented by the dynamic survey engine 102. For example, a feedback loop 606-1 may update the training data 606 with one or more portions of the aggregated survey response content 310. Additionally, the feedback loop 606-1 may be utilized by the dynamic survey engine 1022 dynamically update one or more relationships represented in the survey mapping 304. Another feedback loop feedback loop 606-2 may update the previously predicted actions 614 in the training data 606 with one or more recent predicted actions 604 generated by the machine learning network(s) 602. Another feedback loop feedback loop 606-3 may update the training data 606 based on one or more attributes of an identified webinar event 604-1.

It is understood that various embodiments described herein may use any suitable machine learning training techniques to train the machine learning network(s) 602 including, but not limited to a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and other suitable machine learning algorithms.

Figure 7:
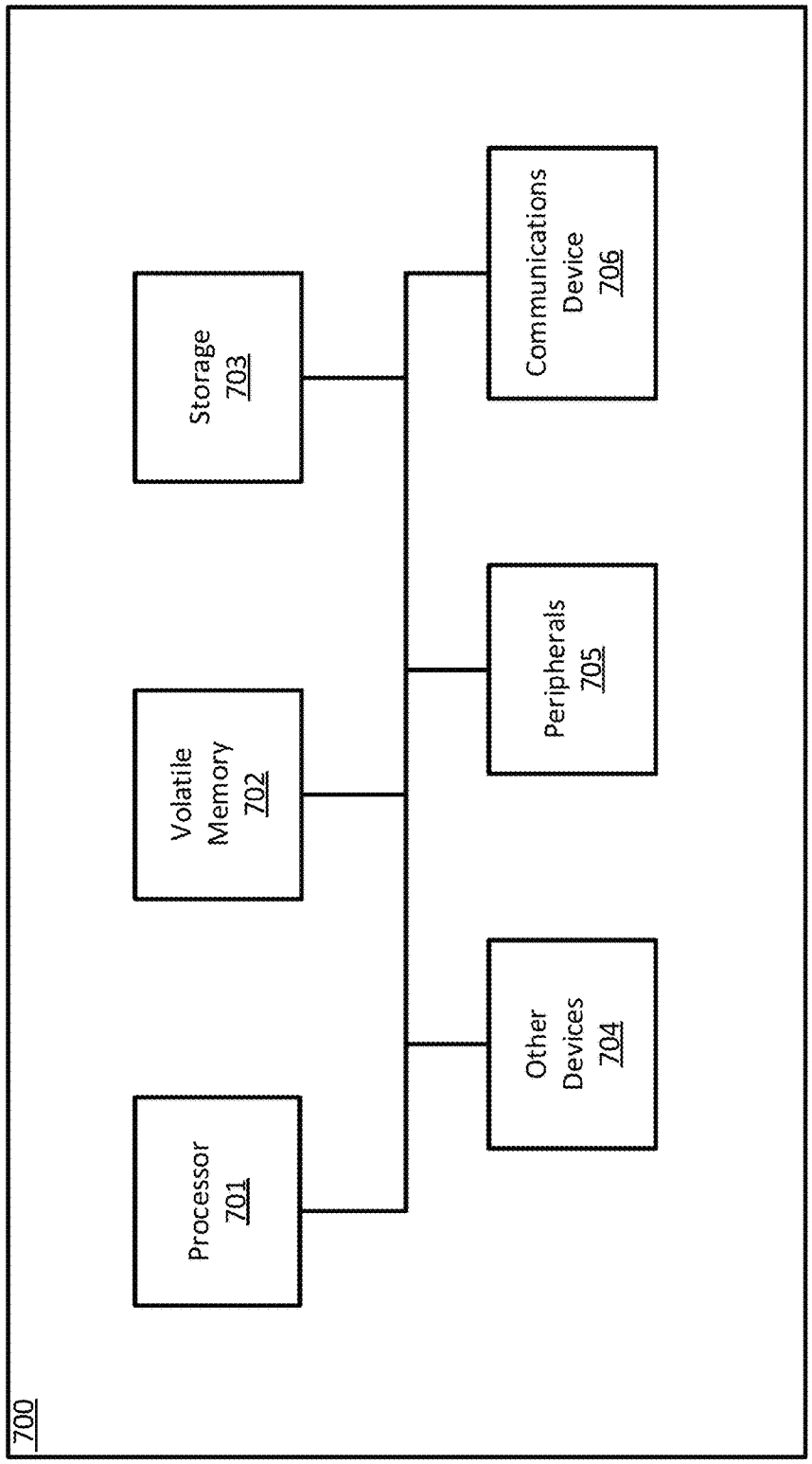
FIG. 7 is a diagram illustrating an exemplary environment in which some embodiments may operate.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 7.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A communication system comprising one or more processors configured to perform operations of:

establishing a virtual meeting by connecting with a plurality of client computing devices associated with a host user account and one or more attendee user accounts and processing audio and video streams to and from the plurality of client computing devices, wherein the virtual meeting comprises a series of scheduled online webinar events, wherein the series of scheduled online webinar events comprises an initial online webinar event and one or more subsequent online webinar events;

receiving survey content and a survey mapping associated with the host user account;

presenting at least a portion of the survey content to the one or more attendee user accounts prior to or during the initial online webinar event;

aggregating survey response content received from the one or more attendee user accounts to generate aggregated survey response content;

determining a predicted subsequent online webinar event using a trained machine learning network based on attributes of the series of scheduled online webinar events, the survey mapping, attributes of the one or more attendee user accounts, and the aggregated survey response content;

dynamically scheduling during the initial online webinar event the predicted subsequent online webinar event to be presented following the initial online webinar event; and updating training data with the aggregated survey response content and the predicted subsequent online webinar event to obtain updated training data for retraining the trained machine learning network.

2. The communication system as in claim 1, wherein receiving survey content and a survey mapping associated with the host user account of the series of scheduled online webinar events comprises:

receiving at least one portion of survey content comprising a query; and receiving a mapping that associates at least one response keyword for the query to at least one action.

3. The communication system as in claim 1, wherein receiving survey content and a survey mapping associated with the host user account comprises:

receiving a plurality of survey queries; and receiving a mapping between response keywords for the plurality of survey queries and one or more mapping nodes.

4. The communication system as in claim 3, wherein each mapping node may be one of: a subsequent survey query and a particular online webinar event, wherein the particular online webinar event comprises one of: a currently scheduled webinar event and an unscheduled webinar event.

5. The communication system as in claim 3, wherein the operations further comprise:
   identifying a plurality of response keyword instances in survey response content received from a plurality of attendee user accounts prior to or during the initial online webinar event, wherein the initial online webinar event is associated with a plurality of subsequent webinar events;
   generating a ranked response keyword list based on the plurality of response keyword instances;
   selecting a particular subsequent webinar event based at least in part on a mapping between the particular subsequent webinar event and a response keyword ranked in the ranked response keyword list; and
   scheduling the particular subsequent webinar event to begin after the initial online webinar event.

6. The communication system as in claim 5, further comprising:
   identifying an additional plurality of response keyword instances in the survey response content received from the plurality of attendee user accounts, the additional plurality of response keyword instances corresponding to respective survey queries presented to one or more of the attendee user accounts during the initial online webinar event; and
   generating the ranked response keyword list based on the plurality of response keyword instances and the additional plurality of response keyword instances.

7. The communication system as in claim 5, wherein scheduling the particular subsequent webinar event to begin after the initial online webinar event comprises:
   updating a scheduled start time of the particular subsequent webinar event.

8. The communication system as in claim 5, wherein scheduling the particular subsequent webinar event to begin after the initial online webinar event comprises:
   changing a placement of the particular subsequent webinar event in a sequence of different subsequent webinar events scheduled to take place after the initial online webinar event.

9. A computer implemented method comprising:
   establishing a virtual meeting by connecting a plurality of client computing devices associated with a host user account and one or more attendee user accounts and processing audio and video streams to and from the plurality of client computing devices, wherein the virtual meeting comprises a series of scheduled online webinar events, wherein the series of scheduled online webinar events comprises an initial online webinar event and one or more subsequent online webinar events;
   receiving survey content and a survey mapping associated with the host user account;
   presenting at least a portion of the survey content to the one or more attendee user accounts prior to or during the initial online webinar event;
   aggregating survey response content received from the one or more attendee user accounts to generate aggregated survey response content;
   determining a predicted subsequent online webinar event using a trained machine learning network based on attributes of the series of scheduled online webinar events, the survey mapping, attributes of the one or more attendee user accounts, and the aggregated survey response content; and
   dynamically scheduling during the initial online webinar event the predicted subsequent online webinar event to be presented following the initial online webinar event; and
   updating training data with the aggregated survey response content and the predicted subsequent online webinar event to obtain updated training data for retraining the trained machine learning network.

10. The computer implemented method as in claim 9, wherein receiving survey content and a survey mapping associated with the host user account of the series of scheduled online webinar events comprises:
    receiving at least one portion of survey content comprising a query; and
    receiving a mapping that associates at least one response keyword for the query to at least one action.

11. The computer implemented method as in claim 9, wherein receiving survey content and a survey mapping associated with host user account of the series of scheduled online webinar events comprises:
    receiving a plurality of survey queries; and
    receiving a mapping between response keywords for the plurality of survey queries and one or more mapping nodes.

12. The computer implemented method as in claim 11, wherein each mapping node may be one of: a subsequent survey query and a particular online webinar event, wherein the particular online webinar event comprises one of: a currently scheduled webinar event and an unscheduled webinar event.

13. The computer implemented method as in claim 11, further comprising:
    identifying a plurality of response keyword instances in survey response content received from a plurality of attendee user accounts prior to or during the initial online webinar event, wherein the initial online webinar event is associated with a plurality of subsequent webinar events;
    generating a ranked response keyword list based on the plurality of response keyword instances; selecting a particular subsequent webinar event based at least in part on a mapping between the particular subsequent webinar event and a response keyword ranked in the ranked response keyword list; and
    scheduling the particular subsequent webinar event to begin after the initial online webinar event.

14. The computer implemented method as in claim 13, further comprising:
    identifying an additional plurality of response keyword instances in the survey response content received from the plurality of attendee user accounts, the additional plurality of response keyword instances corresponding to respective survey queries presented to one or more of the attendee user accounts during the initial online webinar event; and
    generating the ranked response keyword list based on the plurality of response keyword instances and the additional plurality of response keyword instances.

15. The computer implemented method as in claim 13, wherein scheduling the particular subsequent webinar event to begin after the initial online webinar event comprises:
    updating a scheduled start time of the particular subsequent webinar event.

16. The computer implemented method as in claim 13, wherein scheduling the particular subsequent webinar event to begin after the initial online webinar event comprises:
changing a placement of the particular subsequent webinar event in a sequence of different subsequent webinar events scheduled to take place after the initial online webinar event.

17. A computer program product comprising a non-transitory computer-readable medium having a computer-readable program code embodied therein to be executed by one or more processors, the computer-readable program code including instructions to:
establishing a virtual meeting by connecting a plurality of client computing devices associated with a host user account and one or more attendee user accounts and processing audio and video streams to and from the plurality of client computing devices, wherein the virtual meeting comprises a series of scheduled online webinar events, wherein the series of scheduled online webinar events comprises an initial online webinar event and one or more subsequent online webinar events;
receive survey content and a survey mapping associated with the host user account;
present at least a portion of the survey content to the one or more attendee user accounts prior to or during the initial online webinar event;
aggregate survey response content received from the one or more attendee user accounts to generate aggregated survey response content;
determine a predicted subsequent online webinar event using a trained machine learning network based on attributes of the series of scheduled online webinar events, the survey mapping, attributes of the one or more attendee user accounts, and the aggregated survey response content;
dynamically scheduling during the initial online webinar event the predicted subsequent online webinar event to be presented following the initial online webinar event; and
updating training data with the aggregated survey response content and the predicted subsequent online webinar event to obtain updated training data for retraining the trained machine learning network.

18. The computer program product as in claim 17, wherein the computer-readable program code further instructions to:
identify a plurality of response keyword instances in survey response content received from a plurality of attendee user accounts prior to an initial webinar event, wherein the initial webinar event is associated with a plurality of subsequent webinar events;
identify an additional plurality of response keyword instances in the survey response content received from the plurality of attendee user accounts, the additional plurality of response keyword instances corresponding to respective survey queries presented to one or more of the attendee user accounts during the initial webinar event;
generate a ranked response keyword list based on the plurality of response keyword instances and additional plurality of response keyword instances; select a particular subsequent webinar event based at least in part on a mapping between the particular subsequent webinar event and a response keyword ranked in the ranked response keyword list; and
schedule the particular subsequent webinar event to begin after the initial webinar event.

19. The computer program product as in claim 18, wherein scheduling the particular subsequent webinar event to begin after the initial webinar event comprises:
updating a scheduled start time of the particular subsequent webinar event.

20. The communication system as in claim 1, wherein the training data comprises previous survey response content, user account attributes, previously presented survey queries, previously predicted actions, and previously measured levels of engagement of user accounts.

* * * * *